(12) United States Patent
Du

(10) Patent No.: US 6,480,480 B1
(45) Date of Patent: Nov. 12, 2002

(54) WIRELESS LOCAL AREA NETWORK COMPRISING A CONTROLLER AND AT LEAST ONE CANDIDATE-CONTROLLER TERMINAL

(75) Inventor: Yonggang Du, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/198,045

(22) Filed: Nov. 23, 1998

(30) Foreign Application Priority Data

Nov. 28, 1997 (DE) ......................................... 197 52 697

(51) Int. Cl.⁷ ................................................. H04Q 7/24
(52) U.S. Cl. ........................ 370/338; 370/312; 709/202; 709/239; 709/243; 709/317
(58) Field of Search ................................ 709/245, 202, 709/239, 317, 238; 370/85.1, 86, 311, 312, 338; 395/200.09

(56) References Cited

U.S. PATENT DOCUMENTS

| | | | | |
|---|---|---|---|---|
| 4,792,946 A | * | 12/1988 | Mayo | 370/86 |
| 5,371,734 A | | 12/1994 | Fischer | 370/18 |
| 5,546,397 A | * | 8/1996 | Mahany | 370/85.1 |
| 5,572,528 A | * | 11/1996 | Shuen | 370/85 |
| 5,682,379 A | * | 10/1997 | Mahany et al. | 370/311 |
| 5,805,807 A | * | 9/1998 | Hanson et al. | 395/200.09 |
| 6,195,705 B1 | * | 2/2001 | Leung | 709/245 |

OTHER PUBLICATIONS

Raychaudhuri et al., "WATMNET: A Protype Wireless ATM System for Multimedia Personal Communication", IEEE Journal on Selected Areas in Communications, Bd. 15, Nr. 1, Jan. 1997, pp. 83–95, XP 000637401.

Du Y et al., "System Architecture of a Home Wireless ATM Network", 1996 IEEE International Conference on Universal Personal Communications Record, gateway to the 21$^{st}$ Century, Cambridge, MA, Sep. 29–Oct. 2, 1996, NR. Conf., pp. 477–481, XP 002110817.

"On Architectures for Broadband Wireless Systems" by S. Jiang et al., IEEE Communications Magazine, Oct. 1997, pp. 132–140.

"Contention–Free MAC Protocol for Wireless ATM LAN", by C.Y. Ngo et al., ACTS Mobile Communications Summit 1997, pp. 728–733, Oct. 1977, Aalborg, Denmark.

"Computer Networks" by Andrew S. Tanenbaum, second edition, Prentice–Hall International Inc., 1988, pp. 117–131; 196–212 and 262–265.

\* cited by examiner

*Primary Examiner*—Hassan Kizou
*Assistant Examiner*—Lu Yin
(74) *Attorney, Agent, or Firm*—Daniel J. Piotrowski

(57) ABSTRACT

The invention relates to a local area network for wireless transmission of control and user information between a plurality of terminals and a terminal working as a controller, i.e. a candidate-controller terminal, which candidate-controller terminal is provided for controlling the communication in the local area network. At least a further not candidate-controller terminal can be used as a controller. Besides the controller, at least the candidate-controller terminal receives all the control information necessary for controlling the communication in the local area network.

3 Claims, 3 Drawing Sheets

WIRELESS LOCAL AREA NETWORK COMPRISING A CONTROLLER AND AT LEAST ONE CANDIDATE-CONTROLLER TERMINAL

BACKGROUND OF THE INVENTION

The invention relates to a local area network for wireless transmission of control and user information between a plurality of terminals and a terminal working as a controller, i.e. a candidate-controller terminal, which candidate-controller terminal is provided for controlling the communication in the local area network.

A wireless local area network is understood to mean a network comprising a plurality of terminals between which control and user information is transmitted in a wireless manner. A wireless transmission is used for transmitting information, for example, by radio, ultrashell or infrared channels.

The wireless local area network defined above is known from "Contention-free MAC protocol for Wireless ATM LAN" by C. Y. Ngo et al.; ACTS Mobile Communications Summit 1997, pp. 728–733, October 1997, Aalborg, Denmark, and comprises a plurality of terminals. One terminal works as a controller and controls the communication between the terminals. For data transmission in the asynchronous transfer mode (ATM), cells in this network are inserted into user time slots or user channels and transmitted via a radio transmission medium.

SUMMARY OF THE INVENTION

It is an object of the invention to provide a wireless local area network in which data relating to communication between the terminals are not lost even in the case of a failure of the controller.

The object is achieved by a wireless local area network of the type defined in the opening paragraph in that at least a further not candidate-controller terminal can be used as a controller and in that the candidate-controller terminal is provided for receiving all the control information necessary for controlling the communication in the local area network.

The local area network according to the invention has three types of terminals. One terminal works as a controller, several terminals can be used as a controller after the current controller has failed or has been switched off, and further terminals cannot be used as a controller. In order that a seamless transition to a new controller is possible after the failure or the switch-off of the current controller and the data so far recovered from the control information by the current controller are not lost, these data are also collected in databases of the candidate-controller terminal after the control information has been processed.

Claims 2 and 3 relate to various groups of control information and the storing of data in databases which data to be stored are recovered from the control information. Claims 4 to 6 show that in case of failure or switch-off of the controller a seamless transition from an old to a new controller is possible. Claim 7 explains the various transmission possibilities of control and user information. Claim 8 shows that the invention also relates to a candidate-controller terminal.

BRIEF DESCRIPTION OF THE DRAWINGS

Examples of embodiment of the invention will be explained hereinafter with reference to the Figures in which.

DESCRIPTION OF THE PREFERRED EMBODIMENT

Figure 1:
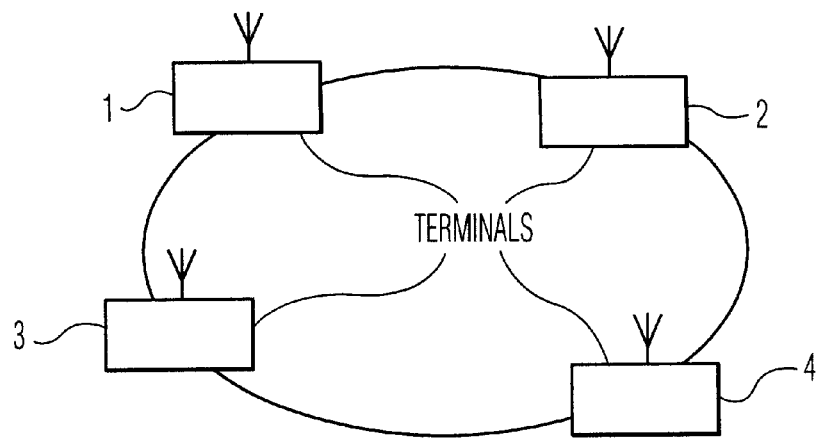
FIG. 1 shows a wireless local area network.

In FIG. 1 is shown an example of embodiment of a local area network comprising four terminals 1 to 4 exchanging data over radio links. The ellipse comprising the terminals 1 to 4 in FIG. 1 denotes the radio coverage area in which a radio transmission between two terminals 1 to 4) is possible without any problems.

The radio transmission between the terminals 1 to 4 may take place for example, according to a TDMA, FDMA or CDMA method (TDMA=Time-Division Multiple Access; FDMA=Frequency-Division Multiple Access; CDMA=Code-Division Multiple Access). The methods may also be combined, as appropriate. With the aid of said methods, for example, digitally available information signals may also be transmitted between the terminals 1 to 4 in digital information signals contained in packets. An example for a packet transmission method is the Asynchronous Transfer Mode (ATM) which generates packets of a defined byte length which packets are called cells. A cell contains a header field of, for example 5 bytes and an information field of, for example, 48 bytes. The information contained in the header field of the cell is used, more specifically, for addressing and carrying out ATM switching functions.

Figure 2:
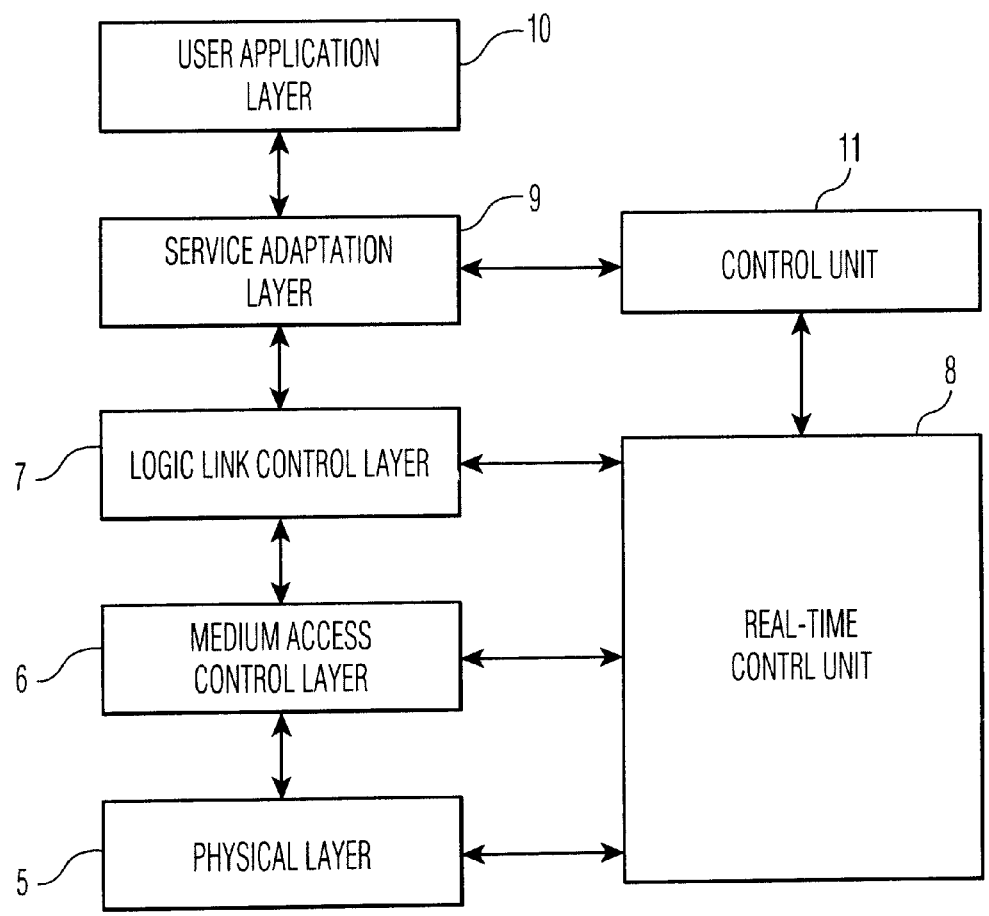
FIG. 2 shows an architecture model of the layers or protocols respectively, of a terminal that can be used in the local area network shown in FIG. 1.

In FIG. 2 is shown an architecture model of the various layers or protocols respectively, used in a terminal 1 to 4. The bottom, physical layer determines, similarly to the OSI layer model, the radio transmission functions for the transport of the data or messages respectively, on the radio transmission medium. This physical layer is denoted block 5 in FIG. 2. A second layer which is referenced MAC (MAC=Medium Access Control) layer is based on the first layer and is featured by block 6 in FIG. 2. The layer superimposed on the MAC layer is the third or LLC (LLC=Logic Link Control) layer which is referenced block 7 in FIG. 2. The protocols of the MAC and LLC layers relate to the access control and protective layer of the OSI layer model. The MAC layer controls the multiple access of the terminals to the transmission medium (radio transmission medium) and the LLC layer carries out a flow and error control. Such protocols are known from, for example, "On Architectures for Broadband Wireless Systems" by S. Jiang et al., IEEE Communications Magazine, October 1997, pp. 132 to 140, or from "Contention-free MAC protocol for Wireless ATM LAN" by C. Y. Ngo et al., ACTS Mobile Communications Summit 1997, pp. 728–733, October 1997, Aalborg, Denmark, or from "Computer networks" by Andrew S. Tanenbaum, second edition, Prentice-Hall International Inc., 1988, pp. 117 to 131, 196 to 212 and 262 to 265.

For real-time control of the physical, the MAC and the LLC layer, a lower control unit is shown as block 8. This lower control unit is appropriate for, for example, the channel or time slot allocation when a TDMA method is used and with the frame synchronization for setting the parameters for the error protection. To this lower control unit is assigned a MAC database which contains data recovered from MAC control information to be explained below.

A service adaptation layer which is featured as block 9 in FIG. 2 is based on the LLC layer. This service adaptation layer adapts data to a specific format which data are supplied by the top layer which is denoted as a user application layer and is represented by block 10 in FIG. 2. For example, such a layer can generate cells in the asynchronous transfer mode (ATM) (packetizing function). These cells or other data coming from the adaptation layer are fed in the MAC layer as user application information to certain transport channels provided for radio transmission. The user application layer may be, for example, an element supplying speech data or video data or data of a service. A speech codec supplies, for example, speech data of a user. A video codec supplies data of a video source. The data of a service may be, for example, data according to the Internet Protocol, E-mail data and so on and so forth.

Parallel to the service adaptation layer there is an upper control unit referenced block 11 in the FIG. 2. This upper control unit is appropriate for, for example, the registration of a terminal for the connection control between, for example, two terminals (call admission control) and so on. To the upper control unit is assigned a terminal and connection database. In the terminal database is stored, for example, registration information of the terminals forming part of the local area network. The connection database contains data assigned to connections, for example, the subscribers (users) of the connection and the data featuring the connection (bandwidth, type of connection and so on). Depending on whether a normal terminal (without a controller function) or a candidate-controller terminal is concerned, the complexity of the lower and upper control units and the respective data to be managed in the databases may be different.

Figure 3:
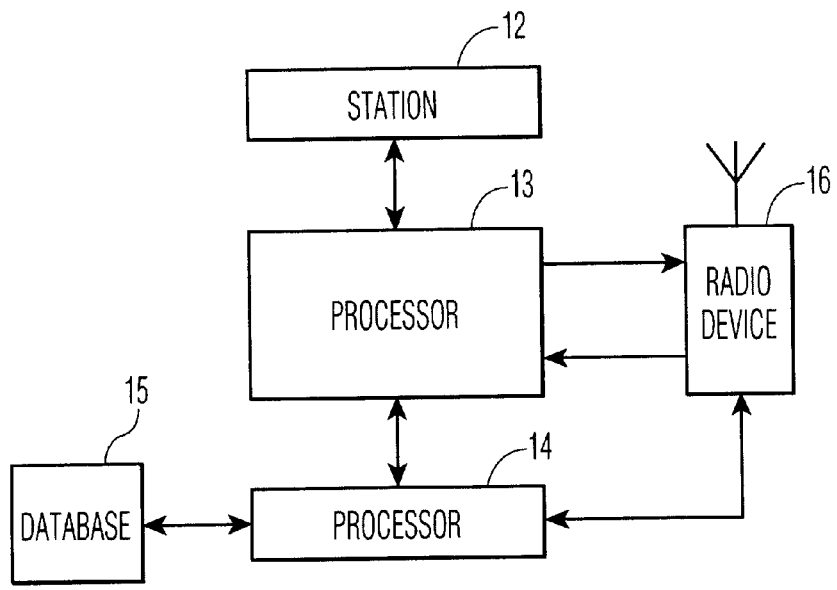
FIG. 3 shows a block circuit diagram of a terminal that can be used in the local area network shown in FIG. 1.

An example of embodiment of a terminal 1 to 4 is shown in FIG. 3. Such a terminal comprises a station 12, a first and a second processor 13 and 14, a terminal and connection database 15 and a radio device 16. The station 12 which carries out the user application layer protocol may be, for example, a videophone, a personal computer, a workstation or a telephone. The processor 13 is appropriate for executing the protocol of the user application layer and can convert, for example, data supplied by a station into ATM cells or take data from the ATM cells supplied by the radio device 16 (segmentation and reassembly). The second processor 14 exchanges data with the terminal and connection database 15, the radio device 16 and the first processor 13 and carries out the functions of the upper control unit.

Figure 4:
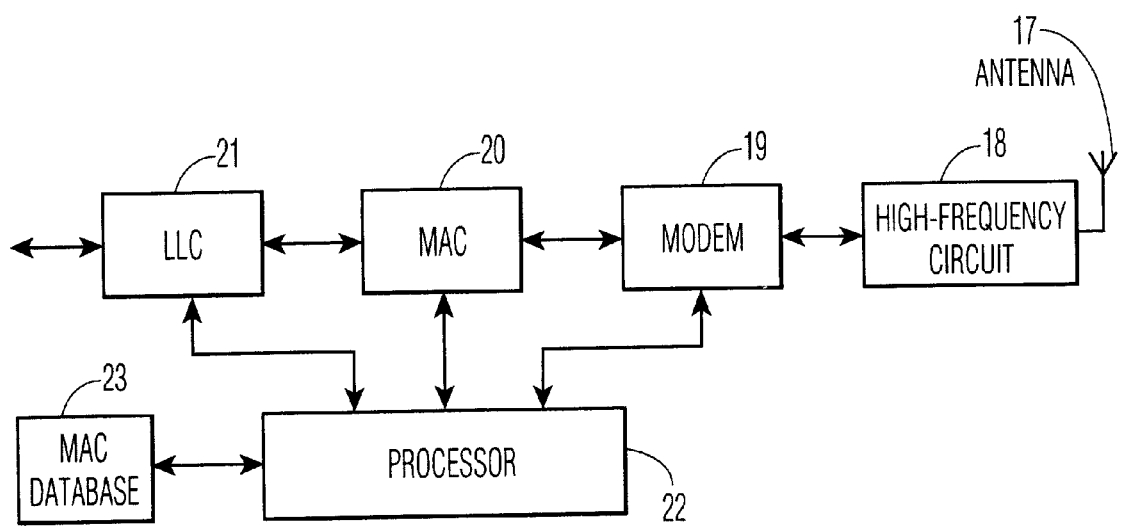
FIG. 4 shows a radio device that can be used in a terminalshown in FIG. 2.

The radio device 16 is represented in more detail in FIG. 4. It comprises an antenna 17, a high-frequency circuit 18, a modem 19, a MAC circuit 20, an LLC circuit 21, a third processor 22 and a MAC database 23. The circuit elements 18 and 19 need no further explanation, because they are known from other radio devices. The MAC and LLC circuits carry out the functions of the MAC and LLC layer and may be realized, for example, as a fourth and fifth processor. Data are transmitted between the first processor 13 and high-frequency circuit 18 via the circuit network of LLC circuit 21, MAC circuit 20 and modem 19. The third processor 22 exchanges data with a MAC database 23, controls the LLC and MAC circuits 21 and 20 and the modem 19 and carries out the functions of the lower control unit.

The data exchange in the local area network is controlled by the one of the terminals 1 to 4 that is denoted as a central controller. Between the terminals 1 to 4 there is a distinction between two types of communication flows. A first communication flow relates to the exchange of control information between the central controller and the other terminals. The transmission of user information between the terminals of the local area network is a characteristic feature of the second communication flow. These communication flows may be further explained with reference to FIG. 5 which shows four terminals 24 to 27. The terminal 27 is the central controller. Control information is exchanged between this central controller 27 and the terminals 24 to 26. This first communication flow is denoted by broken lines which are ended by respective arrows. Thus control information may be transmitted between the terminals 27 and 24, the terminals 27 and 25 and the terminals 27 and 26. User information, on the other hand, is transmitted among each other between all the terminals 24 to 27. This is shown by unbroken lines which are ended by respective arrows in FIG. 4.

The central controller 27 thus acts as a normal terminal for the exchange of user information and as an exchange for exchanging control information. With regard to the first communication flow, there is a star topology with the controller in the center and with regard to the second communication flow there is a fully meshed topology.

Three groups of control information can be distinguished, which is distinguished with respect to its invocation rate. This means that certain control information influences slow processes and other fast processes.

The first group of control information influencing slow processes relates to the inclusion or registration of a terminal in the local area network (registration phase). It is control information which is used, for example, for identification of the terminal or user authenticity, for examining the terminal or user profile, for assigning the identification number of the terminal and so on. A terminal profile is understood to mean, for example, the indication of the method (for example, ISDN, ATM and so on), the maximum transmission capacity and so on. The control information of the first group is also called terminal control functions. It should further be mentioned that the central controller during the registration phase registers the terminal via an entry in the terminal database 15 and applies, for example, status messages and so on to the terminal to be included in the network.

The second group of control information relates to properties that are relevant to the connection. A terminal included in the local area network is to signal, for example, the type of connection, the required bandwidth and the total useful life of the connection and so on (signaling) before it sets up a connection to the central controller. A type of connection is understood to mean a unicast connection, a multicast connection or a broadcast connection. A unicast connection or end-to-end connection consists of a connection between a first terminal and a second terminal. A multicast connection or point-to-multipoint connection is a connection between a terminal and a plurality of other terminals of the local area network. In a broadcast connection, a terminal is connected to all the other terminals of the local area network. The bandwidth is understood to mean that, for example, an average, a minimum etc. bandwidth is agreed between terminal and central controller. The control information of the second group is also called call control functions.

The group of control information influencing the third- and fastest processes relates to the functions of the MAC layer (MAC protocol), i.e. the multiple access to the radio transmission medium. The control information of the third group is also called MAC control functions. The MAC protocol uses at least one MAC control channel for transmitting MAC control functions, over which channel user channels for transmitting user information are assigned to the respective terminals. There are three methods of transmitting control information. With the first method, a collision channel is used for transmitting the MAC control functions of all the terminals. If two terminals simultaneously access the collision channel, such a conflict may be resolved by means of the ALOHA protocol. For the transmission of MAC control functions a second method utilizes a MAC control channel fixedly assigned to a terminal. This is denoted a static assignment. With a third method only one MAC control channel is assigned to one terminal when MAC control functions are to be transmitted. This is denoted a dynamic assignment.

One such dynamic method is, for example, the so-called "Piggyback" method in which a MAC control function is sent onto a channel together with user information in order to supply the central controller with the demand for the next user information to be transmitted by means of the MAC control function. If no user information is transmitted over a rather long period of time, a connection is to be set up again for exchanging MAC control functions to the central controller before the central controller can assign a channel for user information. According to this method, the controller is always to receive the MAC control function appended to the user information, even if the user information is not exchanged with the central controller.

To avoid a renewed connection set-up with the "Piggyback" method, the dynamic method known from "Contention-free MAC protocol for Wireless ATM LAN" by C. Y. Ngo et al.; ACTS Mobile Communications Summit 1997, pp. 728–733, October 1997, Aalborg, Denmark can be used. According to this method, terminals which have not sent user information for a specific period of time, but to send user information again, send short pulses at an instant predefined by the central controller. The controller can then again assign a channel for user information to the terminal and MAC control functions can be transmitted according to the "Piggyback" method.

Figure 5:
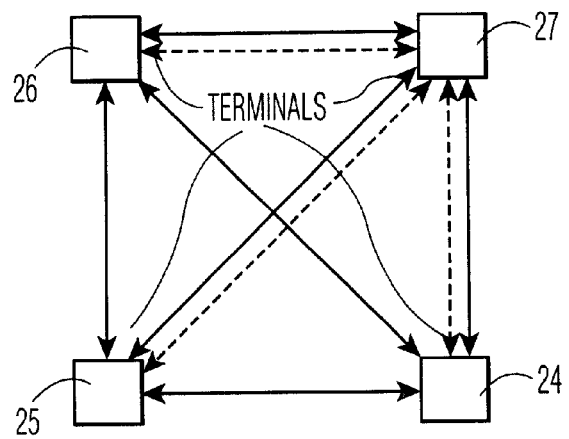
FIG. 5 is a symbolic representation of the communication flow between four terminals of a local area network.

The control functions described above not only apply to a wireless local area network operating in the asynchronous transfer mode, but also to other methods. In the following, a MAC protocol will be described in which the data exchange between the terminals 1 to 4 is effected according to the TDMA method. The respective MAC frame structure is shown in FIG. 5. A frame contains a channel CS (contention channel) which has collisions, a control downlink CD, a control uplink CU and a plurality of transport channels UC1, . . . , UCn.

The contention channel CS is necessary for a terminal to be included in the local area network. A terminal informs the central controller of its presence by this contention channel. To enable at least two terminals to simultaneously access the contention channel CS, for example the ALOHA protocol can be used in the respective terminals.

When a terminal is registered in the local area network, the central controller can utilize the control downlink CD for sending MAC control functions to the newly included terminal. Also the other included terminals can be supplied with MAC control functions by this control downlink CD after which the terminals send requests for transport channels to the controller by the control uplink. Via the control downlink a terminal is then assigned transport channels for the reception and transmission of user information.

The control uplink may contain sub-channels which are assigned each to a terminal in a static or dynamic manner and to which a terminal feeds its requests. The controller may then be informed of, for example, the amount of user information. With respect to the example of the local area network operating in the asynchronous transfer mode, the amount of information corresponds to the number of cells to be transmitted. If the controller does not know the priority of the user information to be transmitted, the priority may be transmitted to it. This centralized co-ordination with the aid of the central controller avoids a collision in the transport channels. One transport channel is namely accessed by only one terminal in a frame. Furthermore, when the priority of user information has been taken into consideration, there may also be achieved that time-critical user information of a terminal is first sent over the transport channels as less time critical user information (for example, speech).

Figure 6:
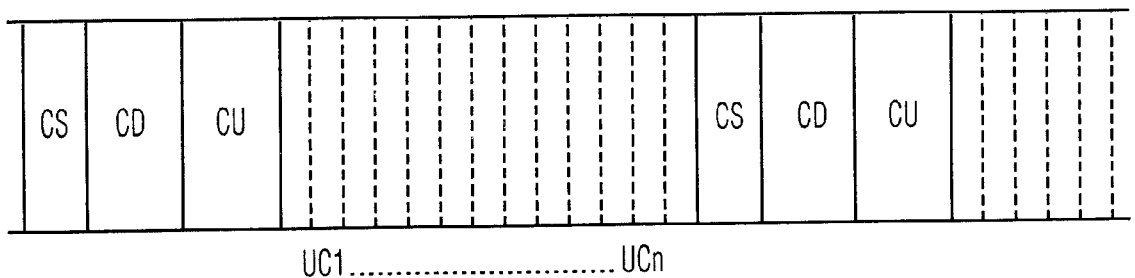
FIG. 6 is the frame format of the signal exchanged between the terminals.

The requests arriving over the control uplink CU during a MAC frame (compare FIG. 6) are evaluated with a certain allowance, which is not relevant to the invention—for example, also considering the priority of user information—and the result is announced to the respective terminals over the control downlink CD of the next frame. As a result, each terminal is informed of which transport channel UC1 to UCn has been assigned for the transmission of user information in the MAC frame. If ATM cells are to be transmitted, the length of a transport channel may correspond to the length of a cell or the length of a plurality of cells. The assignment message naturally also contains the message which terminal sends user information and which terminal receives this information. The sending terminal is the terminal that has sent the request to the controller. For example, a first terminal is assigned three transport channels to send user information to a second terminal and five transport channels to send user information to a third terminal. Simultaneously, these three transport channels are assigned to the second terminal and these five transport channels are assigned to the third terminal to receive user information from the first terminal. This establishes a direct connection between the first and second or first and third terminals. For correctly assigning transport channels, the controller refers back to connection relevant information which is applied thereto during a connection set-up. The relevant information is, for example, information about the bandwidth and priorities.

Until now there has been assumed that in the local area network the central controller is fixed. However, it is possible for various terminals to set up a local area network and to determine one of these terminals to be controller of a certain protocol to be described in the following. However, only such terminals may act as a controller that contain the respective protocol. Such terminals are referenced candidate-controller terminals in the following.

An active controller in the local area network sends a synchronization pulse and necessary system codes (for example, network codes of a specific group) over a certain frequency band at certain distances in time. When a candidate-controller terminal, after being activated, detects the synchronization pulse in a certain predefined frequency band, the terminal first tests in a first step whether it wishes to set up a connection to the controller or whether the connection is possible. If this is possible, the operations described above for registering a terminal are started.

When the candidate-controller terminal does not detect any synchronization pulse during a certain period of time, it generates its own synchronization pulse in a second step. This terminal thus intends to become the controller. It may be possible, however, that two candidate-controller terminals simultaneously send out synchronization pulses. When a terminal sends out a synchronization pulse it cannot at the same time detect such a pulse. For solving this problem, further synchronization pulses are transmitted at randomly selected instants, so that the overlapping automaton does not occur. During the time in which it does not send out a synchronization pulse, a terminal verifies whether another synchronization pulse occurs. When a terminal detects a synchronization pulse, the formation of further synchronization pulses is terminated and after a certain random time period the test in accordance with the first step is started again. When a candidate-controller terminal sends its synchronization pulse within a randomly selected period of time at an instant predefined by frames and does not detect a synchronization pulse from another terminal during the remaining period of time, this terminal becomes the active controller of the local area network.

In the local area network it is also possible for a terminal acting as a controller to fail or to be removed from the network. In that case, a hand-over procedure from the previous controller to a candidate-controller terminal is carried out. The protocol necessary for this purpose, which is also stored in the candidate-controller terminal will be described in the following. The hand-over procedure carries out a seamless transition between the former and the new controller so that, for example, no connections need be set up again. With this seamless transition, all time information and control information is handed over. The time information relates to, for example, the frame start, and so on.

In a local area network there are often a plurality of candidate-controller terminals. The current controller may select one or a plurality of these candidate-controller terminals as candidates for a successor to this controller. Such a selection is a continuous process because a candidate can be removed from the network sooner than the current controller. The message about the selection as a candidate can be applied to a terminal, for example, by the control downlink of the current controller.

For realizing a rapid transition between the former and the new controller, the candidates are supplied with the relevant MAC control functions of the current controller and of the terminals which are to process these MAC control functions. This is simply possible because all the candidate-controller terminals can receive the MAC control functions of the current controller. All the candidate-controller terminals can receive the MAC control functions of the current controller by the control downlink. All the candidate-controller terminals receive the requests of all the terminals by the control uplink. These control functions may be processed in the same manner as in the current controller and be stored in specific databases provided for this purpose. The only difference between the current controller and the controller candidate is that the candidate transmits no data recovered from the processing of the MAC control functions.

The controller also transmits frame information, so that the terminals can synchronize with the controller as regards the frame. The frame information may then be formed according to the type of frame. For example, a fixed or flexible frame format may be used.

A controller processes the above-described control functions subdivided into three groups. The data exchange between the current controller and the candidates with respect to the controller-relevant control functions is organized in such a way that the control functions of the third group (MAC control functions) are transmitted by the control downlink and control uplink. The candidates constantly receive the control functions available in the two links and carry out the same protocol as the current controller, so that they have the same status. The data recovered from the MAC control functions are stored by the current controller and by the candidates in a respective MAC database.

Since the current controller also operates as a normal terminal, it is necessary for this controller to send, for example, certain respective requests for transport channels by the control downlink CD. This also makes it possible for the candidates to accordingly process these requests from the controller.

Alternatively, it is possible for a candidate to compare the contents of its MAC database with the contents of the MAC database of the current controller via additional specific MAC control functions which cannot be interpreted by the not candidate-controller terminals. If there are differences, the candidate will request a copy of the MAC database by the control uplink of the current controller which current controller will send a respective copy to the candidate.

The data exchange between the current controller and the candidates with respect to the control functions of the first and second groups (terminal and call control functions) is realized via transport channels. For this purpose, a multicast connection between the current controller and the candidates is set up and then the modified data of a terminal and connection databank of the controller are transmitted to the candidates via the transport channels. These candidates then store the received data in their respective terminal and connection databases. Such a transmission is then carried out when the contents of the terminal or connection database have been changed. When the controller has determined a new candidate, this new candidate receives via a unicast connection the total contents of the terminal and connection database of the controller and stores these contents in its own database.

In addition to the various data recovered from the control functions, a candidate is also to receive synchronization information and time information. For guaranteeing a seamless transition of synchronization information, a controller or a candidate-controller terminal respectively, is to have an emergency power supply (not shown). Such an emergency power supply may be, for example, a battery or a charged capacitor during normal operation. This emergency power supply is switched on when the controller fails or is switched off. The instant of the failure or of the switching-off of the controller will be denoted as instant of failure in the following.

After the instant of failure, the current controller sends at least one message (failure message) over the control downlink that the current controller has failed. This message of failure is received by the candidates. The individual candidates have received a priority from the current controller during normal operation. The higher the number of priority is, the lower is the priority. A candidate having the priority $p\_i=0$ has the highest priority. Soon after the reception of the message of failure the candidate $CC\_i$ having the highest priority ($p\_i=0$) at the predefined instants generates the synchronization pulse necessary for the network synchronization, which pulse has so far been generated by the previous controller, and thus takes over the time-dependent control of the MAC frame.

It is possible also for the candidate $CC\_i$ having the priority $p\_j=0$ to fail after the last MAC frame of the previous controller. If t is the referenced instant of the last instant for the synchronization pulse explicitly or implicitly announced by the previous controller, which synchronization pulse, however, has not occurred due to the failure or switch-off of the controller but is expected, then the candidate $CC\_J$ having the priority $p\_j = 1$ generates a synchronization pulse when this candidate has not detected any synchronization pulse of the candidate $CC\_i$ after the period of time $t+\delta t$. This process may be carried on until a suitable candidate has been found. Generally there may be stated: when k candidates having a higher priority have not generated any synchronization pulse, the candidate $CC\_m$ having the priority $p\_m=k$ must send a pulse at the instant $t+k\ \delta t$. This candidate $CC\_m$ becomes the new controller. The parameters k and $\delta t$ are to be selected such that the product $k\ \delta t$ brings about only a tolerable shift of synchronization and consequent frame delay.

The candidate terminal that has transmitted the synchronization pulse becomes the new controller. It can seamlessly succeed the previous controller in the processing process because the previous controller has stored all the relevant data in the MAC, terminal and connection databases.

The transition described above from a previous to a new controller is now possible if, prior to the instant of failure, the previous controller informs the candidate-controller terminals of the instant of the synchronization pulse explicitly or implicitly via the control downlink CD. An explicit message represents an specially generated MAC control function. An implicit message is no specifically generated MAC control function, but can be deduced, for example, from the frame information when a constant-length frame is present.

In the local area network described above there is no collision with respect to the user information as does occur, for example, in a network operating according to the Ethernet or Hyperlan method. In the GSM method, however, a freedom of collision with respect tot the user information is realized. But no dynamic transport channel allocation is possible then and a control of communication is exclusively effected via a base station. On the other hand, the invention achieves that the control of the communication is effected via a terminal operating as a controller.

What is claimed is:

1. A local area network for wireless transmission of control and user information between a plurality of terminals and a terminal working as a controller, a controller terminal, which controller terminal is provided for controlling the communication in the local area network, wherein at least a further terminal not working as a controller can be used as a controller and in that the candidate-controller terminal is provided for receiving all the control information necessary for controlling the communication in the local area network, wherein a controller is provided for registering a terminal in the network, for controlling the connection and for controlling the multiple access to the transmission medium and in that the controller contains at least a database used for storing data derived from control functions for the registration, for the connection control and for the multiple access control and the candidate-controller terminal contains at least a database used for storing data derived from control functions for the registration, for the connection control and for the multiple access control and the control functions relating to the control of the multiple access are transmitted by a control channel and the further control functions after a respective connection set-up are transmitted by the transport channels provided for the transmission of user information.

2. A local area network as claimed in claim 1, wherein a controller that has failed or has been switched off transmits a failure message after the failure or after the switch-off and in that a candidate-controller terminal that has the highest priority takes over the synchronization of the network by means of a synchronization pulse after it has selected the failure message, the occurrence of the synchronization pulse being determined by an instant predefined by the previous controller.

3. A local area network as claimed in claim 2, wherein after a specific period of time following the failure message a candidate-controller terminal that has a lower priority is used for generating a synchronization pulse and thus takes over the synchronization of the network when the candidate-controller terminal that have a higher priority have not generated any synchronization pulse.

\* \* \* \* \*